United States Patent Office 3,510,152
Patented May 5, 1970

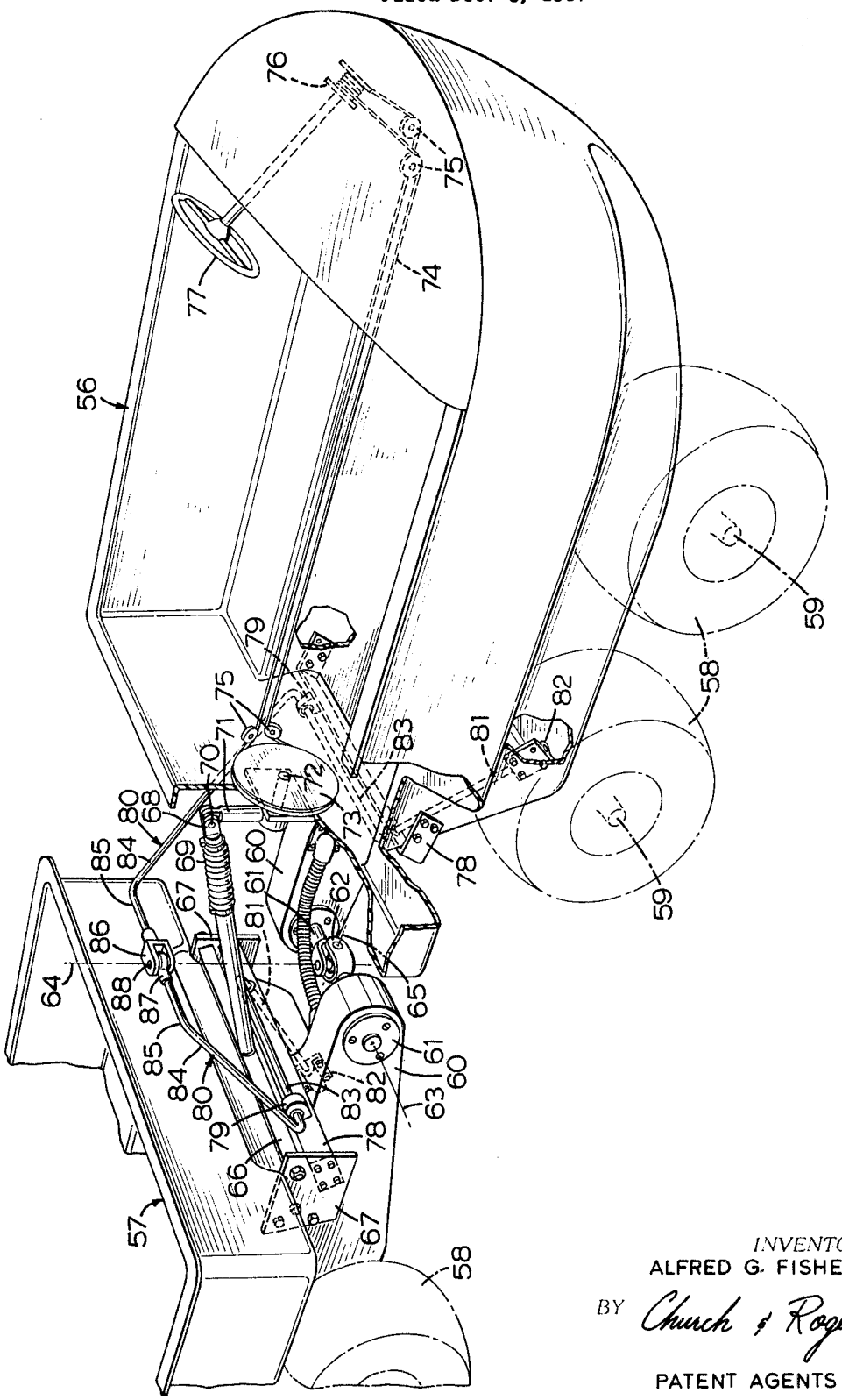

3,510,152
ARTICULATED VEHICLES
Alfred G. Fisher, Oakville, Ontario, Canada, assignor, by mesne assignments, to American Machine & Foundry Company, New York, N.Y., a corporation of New Jersey
Filed Dec. 8, 1967, Ser. No. 689,122
Int. Cl. B60d 1/00
U.S. Cl. 280—484                                8 Claims

ABSTRACT OF THE DISCLOSURE

An articulated vehicle comprising two bodies articulatedly connected together for relative pivoting, pitching and rolling motions by a universal joint is provided with spring means which permit free relative pivoting steering motion, but which oppose relative pitching and/or rolling motions from a predetermined median position.

---

This invention relates to improvements in articulated vehicles of the type comprising at least two vehicle units, so articulated together that they can pivot, pitch and roll relative to one another.

In the type of articulated vehicle intended for use on hard, smooth-surfaced roads, such as tractor-trailer combinations, the two units are pivotally connected to one another for free pivoting movement about a vertical axis, but the range of pitch about a horizontal axis perpendicular to the direction of travel, and the range of roll about a horizontal axis parallel to the direction of travel are strictly limited. In articulated vehicles of the type intended for use on difficult terrains, and in traversing water, snow and/or soft ground, as many as possible of the ground-engaging members on which the vehicle travels should be driven, and greater ranges of pitch and roll must be permitted by the articulated connection, so that the vehicle can conform as closely as possible to the terrain over which it is moving, thereby maintaining as many as possible of the said ground-engaging members in driving engagement with the terrain. There is disclosed in my U.S. patent specification Ser. No. 3,353,618, issued Nov. 21, 1967, a particular form of articulated vehicle wherein two vehicle units, each of which comprises at least two longitudinally spaced pairs of wheels, or two transversely-spaced ground-engaging tracks, are connected to one another by a universal joint. A driving motor is mounted in one of the units and this universal joint not only drivably connects the two vehicle units for transfer of motive power from the motor in one unit to the other unit, but also articulatedly connects the two units together for relative pivoting, pitching and rolling motions about respective axes. The vehicle also comprises means interconnecting the two units to constrain them against relative pivoting motion about the said vertical pivot axis of greater than predetermined extent, and preferably these means comprise steering link means, which steer the vehicle by pivoting the two units relative to one another about the said vertical pivot axis.

It is an object of the present invention to provide a new articulated vehicle.

In accordance with the present invention there is provided an articulated vehicle comprising at least two vehicle units, each of which units is mounted upon respective ground-engaging members for movement over the ground, means mounting a universal joint between the said units with its principal rotational axis generally parallel to the axes of rotation of the said ground-engaging members and connecting the said vehicle units to articulatedly connect the two units together for relative pitching motion about the said principal rotational axis, relative pivoting motion about a horizontal axis, and relative rolling motion about a horizontal axis, characterised by spring means interconnecting the said two vehicle units, said spring means permitting free pivoting motion of the said units relative to one another about the said vertical pivot axis, and opposing the said relative pitching motion and/or the said relative rolling motion from a predetermined median position of the two vehicle units.

DESCRIPTION OF THE DRAWING

A particular preferred embodiment of the invention will now be described, by way of example, with reference to the accompanying drawing, which is a perspective view of a front unit and part of a rear unit of a two-unit articulated vehicle, taken from one side and from above, parts of the vehicle being shown broken away as required for details of its construction to be seen.

The particular articulated wheeled vehicle illustrated herein comprises first and second similar vehicle units 56 and 57 respectively, connected end-to-end with the first unit 56, normally constituting the front unit. For convenience in description and definition in the appended claims references to planes, axes of rotation, etc. will always be made as if the vehicle were standing on a level surface with the two units thereof directly one behind the other, and the axes of rotation of all the wheels parallel to one another. Each vehicle unit comprises a smoothly-contoured generally boat-shaped body that is somewhat elongated in the intended direction of travel of the vehicle. The two bodies are of exactly similar shape, turned end-for-end.

Each body runs on two longitudinally-spaced wheel and axle assemblies, each constituted by two relatively small diameter, low-pressure balloon wheels 58, and a connecting axle 59, these wheels being disposed in respective relatively wide side recesses formed in the lower portion thereof, the two recesses providing between themselves a relatively deep well portion having vertical side walls. Each body comprises a longitudinal extension portion 60, which protrudes from one end and is offset to one side of a longitudinal vertical plane that passes centrally through the unit bodies, the two extensions overlapping one another on opposite sides of the said plane when the units are reversed end-for-end. Each extension has a respective rotatable shaft member 61 mounted therein for rotation about an axis perpendicular to the vehicle longitudinal axis, the ends of the two shaft members that protrude towards each other being connected together by means of a universal joint 62 having its median axis 63 coaxial with the coaxial axes of rotation of the said two members 61. In operation this universal joint will usually be enclosed by a flexible sleeve (not illustrated) that protects it against the deleterious effects of dirt, moisture, etc.

For a more specific description of the mounting of the wheel and axle assemblies in the respective bodies, and their connection via respective driving connections and the universal joint so that all of the assemblies are driven by a single motor (not shown) mounted in the rear unit, reference may be made to the specification of my Pat. No. 3,353,618.

The use of a single universal joint as the articulating connection between the two units, gives the units the necessary freedom of movement to pitch about the said median joint axis, pivot about a vertical axis 64 passing through the joint 62, and roll relative to one another about a horizontal axis 65 passing through the universal joint within limits that are dictated only by considerations of safety and stability of the vehicle, and by the desirability of avoiding impacts and rubbing contacts between immediately adjacent parts of the two bodies.

Steering of the vehicle particularly illustrated herein is accomplished by forcing the two verticle units to pivot relative to one another about the vertical axis 64; this does result in some sideways skidding of the vehicle's wheels, but relatively little tire wear is caused thereby with the small size vehicle particularly illustrated herein, and is more than compensated by the simplicity and robustness of the vehicle as a whole.

The particular steering means of this embodiment comprises a horizontal link member 66 of generally T-shaped form, as seen in plan, which is pivotally mounted between two spaced brackets 67 fastened rigidly to the rear unit body for pivoting movement about a respective transverse axis generally parallel to the axis 63. A yoke member 68 is telescopedly mounted in the forwardly-extending leg of the T-shaped member, and is also capable of rotation therein about the longitudinal axis of the leg, the motion of the yoke member in the leg being under the control of a damping member 69, which is connected between the leg and the yoke. A pin 70 connects the yoke to an arm 71 that extends radially upward from a shaft member 72 mounted in a bearing at the rear end of the front body for rotation about an axis lying generally parallel to the axis 65 in the same vertical plane as the longitudinal axis of the vehicle. A disc 73 of sufficiently large diameter to provide the desired steering torque, is fast with the shaft 72, and is rotated as required by means of a cable 74 fastened to the periphery of the disc and passing around pulleys 75 to a rotatable sheave 76 controlled by a steering wheel 77 at the driver's position.

Upon rotation of the steering wheel the arm 71 executes a corresponding rotation about its axis, causing the radially outer end of the arm and the corresponding end of the leg 66 to execute a simple harmonic motion in the respective direction transverse to the vehicle longitudinal axis. It will be seen that the steering mechanism constitutes means under the control of the driver to constrain the units against relative pivoting motion about the vertical pivot axis 64 greater than a predetermined extent, since the mechanism holds the vehicle units in predetermined angular relation to one another, and in particular is used by the driver to prevent any jack-knifing that might otherwise occur, for example, when the vehicle is travelling downhill.

In accordance with the present invention such a vehicle is provided with spring means which will oppose the said pitching motion of the two vehicle units and/or their rolling motion upon relative motion of the units from a predetermined median position, generally the relative position taken by the units when standing upon a smooth level surface. The means provided permit free pivoting movement so that they do not adversely affect the steering of the vehicle.

The particular spring means illustrated herein comprises a torsion bar construction wherein a reinforcing and bracket member 78 is fastened to the immediately adjacent ends of each of the two bodies, each bracket member carrying a respective bearing 79. A generally Z-shaped torsion bar spring 80 has the end of one arm 81 fastened to the respective vertical recess wall by a bracket 82, this arm passing in a direction which is generally upward and toward the adjacent body end through an aperture in the member 78. Another portion 83 of the spring 80 extends at right angles to the portion 81, generally parallel to the horizontal axis 63, and is mounted in the bearing 79 for rotation about a corresponding axis. A further portion 84 of the member 80 extends at right angles to the portion 83 in a direction generally upward and toward the other vehicle unit; the free end of the portion 84 is turned at right angles thereto to constitute a yet further portion 85 which extends parallel to the portion 80. One of the portions 85 ends in a yoke 86, while the portion 85 of the other member ends in a clevis 87 that is freely rotatable upon the respective end portion. The yoke and the clevis are connected to one another by a pin 88 having its longitudinal axis generally coaxial with the vertical pivot axis 64 of the vehicle.

It will be seen that the steering relative pivoting motion of the two vehicle units takes place freely about the pin 88 and the axis 64 without any action upon, and reaction from, the torsion spring means. Pitching motion of the two bodies from the above-described median direction in either of the two possible directions will cause a corresponding torsional deflection of the horizontal portions 83 of the two members 80. Similarly, upon relative rolling motion of the two bodies from the said median position, a corresponding deflection of the portions 84 and 85 takes place. The spring means therefore provide at all times a restoring force which not only permanently tends to return the two bodies to the said median position, but also damps out any minor oscillations of the two bodies relative to one another.

The capacity for relative pitching motion and that for relative rolling motion provided by the spring means in accordance with the invention are not the same. In this particular embodiment the spring means will permit relative pitching of approximately ±30° from the median position, and in practice the extreme positions are determined principally by the amount of such motion that can be accomodated by the steering link means. On the other hand, the spring means are sufficiently strong that, under normal conditions, the relative rolling motion permitted is about ±10°.

The beneficial effect of the spring means in accordance with the invention is evidenced by an enhanced feeling of smoothness and positive control to the driver, with an added feeling of sensitivity through the steering of the vehicle adhesion, and the assurance that the driving wheels will be maintained as much as possible in driving engagement with the ground.

It will be understood of course that other ways of accomplishing the same effect can be obtained, for example by replacing the portions 84 and 85 with respective flat springs, whose bending toward and away from the vehicle centre line resist rolling motion and/or by replacing the horizontal portions 83 by one of the known suspension units employing resilient material sandwiched between two metal members, which members can be relatively rotatable tubes or relatively movable flat plates. Other constructions within the scope of the appendant claims will be apparent to those skilled in the art, although the particular torsion spring means particularly described herein are found to be particularly effective and inexpensive in installation and subsequent operation.

What I claim is:

1. An articulated vehicle comprising at least two vehicle units, each of which units is mounted upon respective ground-engaging members for movement over the ground, means mounting a universal joint between said units with its principal rotational axis generally parallel to the axes of rotation of the said ground-engaging members and connecting the said vehicle units to articulatedly connect the two units together for relative pitching motion about the said principal rotation axis, relative pivoting motion about a vertical pivot axis, and relative rolling motion about a horizontal axis, characterised by spring means interconnecting the said two vehicle units, said spring means permitting free pivoting motion of the said units relative to one another about the said vertical pivot axis, and opposing the said relative pitching motion and the said relative rolling motion from a predetermined median position of the two vehicle units.

2. An articulated vehicle comprising at least two vehicle units, each of which units is mounted upon respective ground-engaging members for movement over the ground, means mounting a universal joint between said units with its principal rotational axis generally parallel to the axes of rotation of the said ground-engaging members and connecting the said vehicle units to articulatedly connect the two units together for relative pitching motion about the said principal rotation axis, relative pivoting motion about a vertical pivot axis, and relative rolling motion about a horizontal axis, characterised by spring means interconnecting the said two vehicle units, said spring means permitting free pivoting motion of the said units relative to one another about the said vertical pivot axis, and opposing the said relative pitching motion and the said relative rolling motion from a predetermined median position of the two vehicle units, said spring means comprising a bar spring member for each vehicle unit, each bar spring member including a first portion extending transversely of the vehicle longitudinal axis and deflectable from a median position by relative pitching motion of the vehicle units and a second portion extending longitudinally of the vehicle axis and deflectable from a median position by relative rolling motion of the vehicle units, means mounting each of said bar spring members to its respective vehicle unit and means connecting the two bar spring members to one another for free relative pivoting motion about the pivot axis.

3. A vehicle as claimed in claim 2, wherein said bar spring member comprises a torsion bar spring member and, wherein said mounting means comprises a bracket member fixed to the respective vehicle unit and retaining one end of said first portion against torsional rotation and a bearing fixed to said bracket member, the bearing mounting the other end of said first portion for torsional rotation about the respective longitudinal axis, and wherein the said second portion is connected at one end to the rotatable end of the first portion and at the other end to the corresponding other end of the second portion of the torsion bar spring member of the other vehicle unit.

4. A vehicle as claimed in claim 3, wherein the means connecting the adjacent ends of the torsion bar spring members comprises a clevis fixed to one said end, a yoke fixed to the other said end, and a pivot pin coaxial with the vertical pivot axis connecting said yoke and clevis for free relative pivoting motion.

5. An articulated vehicle comprising at least two vehicle units, each of which units is mounted upon respective ground-engaging members for movement over the ground, means mounting a universal joint between said units with its principal rotational axis generally parallel to the axes of rotation of the said ground-engaging members and connecting the said vehicle units to articulatedly connect the two units together for relative pitching motion about the said principal rotational axis, relative pivoting motion about a vertical pivot axis, and relative rolling motion about a horizontal axis, characterised by spring means interconnecting the said two vehicle units, said spring means permitting free pivoting motion of the said units relative to one another about the said vertical pivot axis, and opposing the said relative pitching motion and the said relative rolling motion from a predetermined median position of the two vehicle units, said spring means comprising a torsion bar spring member having a first portion thereof extending transversely of the vehicle longitudinal axis and deflectable from a median position by said relative pitching motion of the vehicle units, and a second portion thereof extending longitudinally of the vehicle axis and deflectable from a median position by said relative rolling motion of the vehicle units, bracket means mounting said torsion bar spring member to a respective vehicle unit at one end of said first portion thereof to fix it against torsional rotation, and a bearing mounted to said bracket member, said bearing mounting the other end of said first portion for torsional rotation about the respective longitudinal axis, the second portion of said torsion bar spring member being connected at one end thereof to the rotatable end of the first portion and at the other end thereof to the other vehicle unit.

6. In an articulated vehicle that includes first and second vehicle units connected together by a universal joint that provides for relative rolling, pitching and turning movement between the vehicle units, means mounted between said vehicle units for resisting said rolling and pitching movement between said vehicle units and permitting free turning movement therebetween, said means comprising:

a bar spring member for each of said vehicle units, said bar spring having a first portion extending parallel to the pitching axis and a second portion extending parallel to the rolling axis, and means connecting the two bar spring members to one another for free relative pivoting motion about the turning axis.

7. A combination as claimed in claim 6, wherein said bar spring member comprises a torsion bar spring member and said mounting means comprises a bracket member fixed to a respective vehicle unit and retaining one end of said torsion bar spring member first portion against torsional rotation and a bearing fixed to said bracket member, the bearing mounting the other end of said first portion for torsional rotation about the respective longitudinal axis, and wherein the said second portion of the torsion bar spring member is connected at one end thereof to the rotatable end of the first portion and at the other end thereof to the corresponding other end of the second portion of the torsion bar spring member of the other vehicle unit.

8. A combination as claimed in claim 7, wherein the means connecting the adjacent ends of the torsion bar spring members comprises a clevis fixed to one said end, a yoke fixed to the other said end, and a pivot pin coaxial with the vertical pivot axis connecting said yoke and clevis for free relative pivoting motion.

References Cited

UNITED STATES PATENTS

| 402,676 | 5/1889 | King | 105—3 |
|---|---|---|---|
| 2,559,540 | 7/1951 | MacVeigh | 280—484 X |
| 3,331,618 | 7/1967 | Head et al. | 280—489 X |
| 3,380,757 | 4/1968 | Sprout et al. | 280—489 X |

LEO FRIAGLIA, Primary Examiner

U.S. Cl. X.R.

280—489